(12) United States Patent
Ahmed et al.

(10) Patent No.: US 11,144,666 B2
(45) Date of Patent: Oct. 12, 2021

(54) SELECTIVE DATA ACCESS AND DATA PRIVACY VIA BLOCKCHAIN

(71) Applicant: Toyota Motor North America, Inc., Plano, TX (US)

(72) Inventors: Hazem Ahmed, Plano, TX (US); Mathew Gardner, Lewisville, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 371 days.

(21) Appl. No.: 16/252,407

(22) Filed: Jan. 18, 2019

(65) Prior Publication Data

US 2020/0233973 A1 Jul. 23, 2020

(51) Int. Cl.
*G06F 21/00* (2013.01)
*G06F 21/62* (2013.01)

(52) U.S. Cl.
CPC ...... *G06F 21/6245* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 8,280,617 B2 * | 10/2012 | Young | G16Z 99/00 701/119 |
| 9,374,373 B1 | 6/2016 | Chan et al. | |
| 9,749,140 B2 | 8/2017 | Oberhauser et al. | |
| 9,792,742 B2 | 10/2017 | Johnson et al. | |
| 9,849,364 B2 | 12/2017 | Tran et al. | |
| 9,853,959 B1 | 12/2017 | Kapczynksi et al. | |
| 9,990,418 B1 | 6/2018 | Rogers | |
| 10,521,780 B1 * | 12/2019 | Hopkins, III | G06Q 20/12 |
| 10,885,590 B2 * | 1/2021 | Sivakumar | G06F 16/27 |
| 2017/0039330 A1 | 2/2017 | Tanner, Jr. et al. | |
| 2017/0046652 A1 | 2/2017 | Haldenby et al. | |
| 2017/0251025 A1 | 8/2017 | Varley et al. | |

(Continued)

FOREIGN PATENT DOCUMENTS

| | | |
|---|---|---|
| DE | 102016007472 | 12/2017 |
| WO | WO2017090041 | 6/2017 |

OTHER PUBLICATIONS

Singh et al. "Intelligent Vehicle-Trust Point: Reward Based Intelligent Vehicle Communication Using Blockchain"; 4 pages; Jul. 24, 2017.

(Continued)

*Primary Examiner* — Maung T Lwin
(74) *Attorney, Agent, or Firm* — Snell & Wilmer LLP (57) ABSTRACT

Methods and systems for managing access to a data location associated with a vehicle. The method includes detecting, by one or more sensors of the vehicle, vehicle data. The method also includes recording, by an electronic control unit (ECU) of the vehicle, the vehicle data to the data location. The method also includes storing, by a smart contract located on a blockchain, an access state associated with the data location, the access state indicating one or more devices having access to the data location. The method also includes communicating, by the ECU, an instruction to the smart contract to change the access state associated with the data location to grant access to a third-party device or revoke access from the third-party device.

16 Claims, 8 Drawing Sheets

(56) References Cited

U.S. PATENT DOCUMENTS

| | | | |
|---|---|---|---|
| 2017/0295180 A1* | 10/2017 | Day | H04L 9/0836 |
| 2018/0018723 A1* | 1/2018 | Nagla | H04L 63/08 |
| 2018/0181768 A1* | 6/2018 | Leporini | G06F 21/31 |
| 2018/0367314 A1* | 12/2018 | Egner | H04L 63/0428 |
| 2019/0332955 A1* | 10/2019 | Manamohan | H04L 9/0637 |

OTHER PUBLICATIONS

Leigh "Masters of their own data: banking, privacy, and the trusted network"; 4 pages; Jul. 23, 2018.
Dorri et al. "BlockChain: A Distributed Solution to Automotive Security and Privacy" 7 pages; Dec. 13, 2017.

* cited by examiner

SELECTIVE DATA ACCESS AND DATA PRIVACY VIA BLOCKCHAIN

BACKGROUND

1. Field

This specification relates to a system and a method for regulating access to vehicle data.

2. Description of the Related Art

A vehicle may contain any number of sensors configured to detect any number of respective types of data. For example, a vehicle may have an odometer for measuring vehicle distance travelled or a global positioning system (GPS) sensor for determining the location of the vehicle. In a modern, computerized society, data associated with an individual has become important to companies and governments. Accordingly, the monetary value associated with this data has risen. As the importance and value of data continues to increase, so does the importance of protecting privacy rights of the individuals with whom the data is associated.

SUMMARY

What is described is a system for managing access to a data location associated with a vehicle. The system includes one or more sensors of the vehicle configured to detect vehicle data. The system also includes a smart contract located on a blockchain and being configured to store an access state associated with the data location, the access state indicating one or more devices having access to the data location. The system also includes an electronic control unit (ECU) of the vehicle configured to record the detected vehicle data to the data location and communicate an instruction to the smart contract to change the access state associated with the data location to grant access to a third-party device or revoke access from the third-party device.

Also described is a method for managing access to a data location associated with a vehicle. The method includes detecting, by one or more sensors of the vehicle, vehicle data. The method also includes recording, by an electronic control unit (ECU) of the vehicle, the vehicle data to the data location. The method also includes storing, by a smart contract located on a blockchain, an access state associated with the data location, the access state indicating one or more devices having access to the data location. The method also includes communicating, by the ECU, an instruction to the smart contract to change the access state associated with the data location to grant access to a third-party device or revoke access from the third-party device.

Also described is a vehicle including one or more sensors configured to detect vehicle data and an electronic control unit (ECU) of the vehicle configured to record the detected vehicle data to a data location and communicate an instruction to a smart contract to change an access state associated with the data location to grant access to a third-party device or revoke access from the third-party device, the smart contract being located on a blockchain and being configured to store the access state associated with the data location.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, vehicles, and methods for regulating access to vehicle data. Data in general has increasingly become more valuable, as data is being used in many applications, from marketing to politics. Vehicle data is no different. Location data of a collection of vehicles may be used by a company to determine the driving habits of males between the ages of 18 and 25 on weeknights in July, for example. These driving habits may be used to strategically place advertisements along freeways. In another example, the fuel efficiency data of a collection of vehicles may be used by a municipality to determine the average fuel efficiency of vehicles within the geographic boundaries of the municipality, for emissions regulations purposes.

Existing systems which may be adapted to the vehicle data context have a centralized structure where the collected data is stored and maintained by a single entity. The single entity may own the data as a condition of providing a particular service for little or no cost (e.g., file storage, email hosting, mapping and navigation services) to the user. In these existing systems, the user is unable to establish limitations on the use of the data associated with the user. Thus, there is a need for systems and methods for providing limits and conditions on data associated with a vehicle and/or a user.

The systems and methods described herein disclose a decentralized architecture for storing vehicle data and regulating access to the vehicle data, as well as ensuring the validity of the vehicle data.

Figure 1:
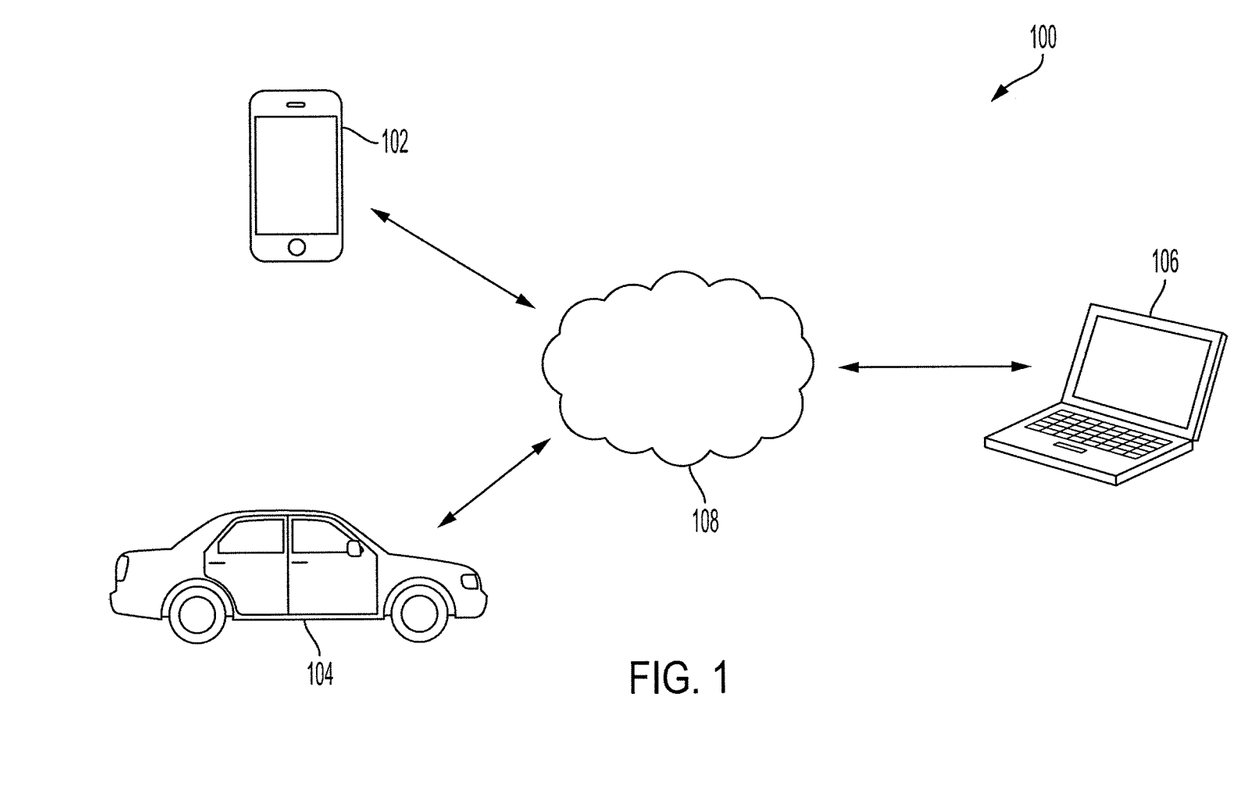
FIG. 1 is a block diagram illustrating a distributed ledger system, according to various embodiments of the invention.

FIG. 1 is a block diagram illustrating a distributed ledger (e.g., blockchain) system 100. The system 100 includes one or more computing devices, such as a smartphone 102, a vehicle 104, or a computer 106, for example. The computing devices 102, 104, and 106 are associated with one or more distributed ledgers. Computing devices 102, 104, and 106 may be associated with vehicle owners, companies, vehicle manufacturers, or vehicle service providers, for example. The computing devices 102, 104, and 106 may maintain and/or update the ledgers. Each computing device 102, 104, and 106 may be configured to store a version of the distributed ledger. Each computing device 102, 104, and 106 may update the ledger by adding ledger entries or updating existing ledger entries.

A distributed ledger may be represented on a blockchain. The use of storing a record on a distributed ledger allows for other entities to check, verify, and/or validate the record placed on the distributed ledger. Moreover, the distributed ledger functions as an immutable record of the recorded information. The immutable record prevents others from tampering with, modifying or deleting any of the records on the distributed ledger.

The computing devices 102, 104, and 106 may be connected to each other and/or to other computing devices via the network 108. A ledger may be stored on a plurality of computing devices, each acting as a node in a distributed architecture for storing a copy of the ledger. In this way, the ledger is collaboratively maintained (possibly anonymously) by any number of computing devices on a network. In some embodiments, the ledger is stored and maintained on a set of trusted computing devices such as the computing devices of authorized users. In some embodiments, a combination of both trusted computing devices and non-verified computing devices are used. In these embodiments, the same or different rules may be applied based on whether the computing device is a trusted computing device or a non-verified computing device. In some embodiments, there may be different levels of nodes with different trust and validation levels.

The ledgers, ledger entries, and/or information stored on the ledger entries may be used for recording vehicle data, which may include location data, fuel data, entertainment data, driving pattern data, interactions between vehicles, and smart contracts, for example. Smart contracts are computer functions located on a blockchain. The smart contracts may be used to facilitate an interaction between two or more parties.

In some embodiments, the ledger is publicly accessible to any computing device. In some embodiments, the ledger is only accessible to authorized computing devices providing the corresponding authentication credentials. In some embodiments, portions of the ledger are public and portions of the ledger are private. When the ledger is publicly accessible, the ledger may be configured so that identifiable information is removed but validation information is maintained. For example, a hash value generated based on particular data may be accessible on the ledger so that the data may be validated, but any identifiable information is obscured.

Figure 2:
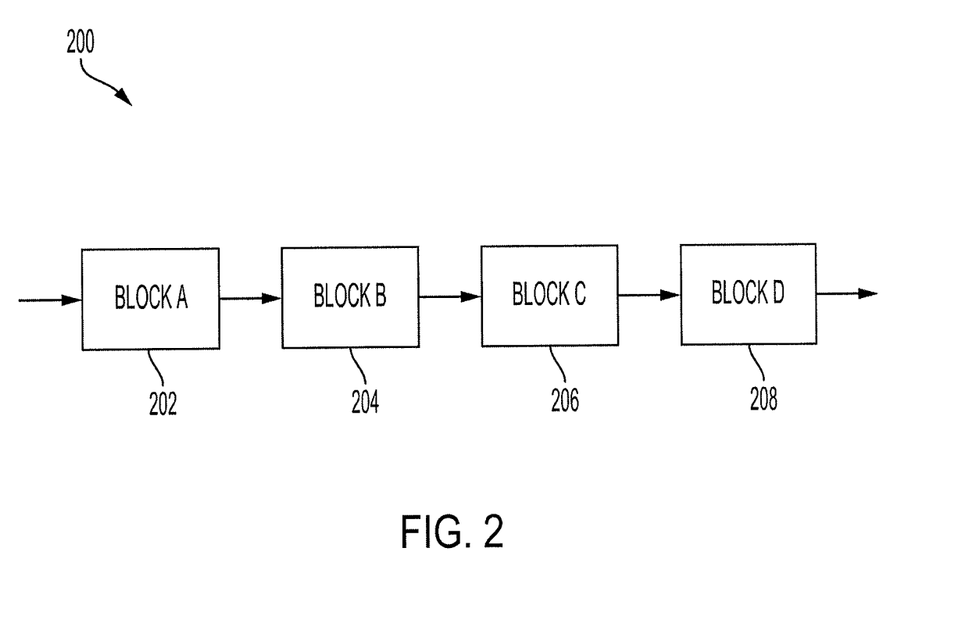
FIG. 2 illustrates a blockchain that may be used in the systems described herein, according to various embodiments of the invention.

FIG. 2 illustrates a blockchain 200 that may be used in the systems described herein. The blockchain 200 includes Block A 202, Block B 204, Block C 206, and Block D 208. In some embodiments, the blockchain 200 is associated with one particular vehicle. In other embodiments, the blockchain 200 is associated with one particular user, such as in situations where transportation is provided as a service, and the user may use any number of different vehicles for transportation.

Each block may include an identifier associated with the vehicle or the user. Each block may also include a time and date indicator identifying when the block was created. When blocks are linked, as the blocks 202-208 are, the blocks may be linked by a hash value based on the contents of the block(s), so that if the block(s) were ever tampered with, the corresponding hash value would change, and the once-connected blocks would no longer be connected. In this way, the hash value connection between the blocks facilitates prevention of changing of the values of the blocks.

Blocks may be created whenever an event occurs. For example, when the blockchain 200 is associated with a vehicle, Block A 202 may be created when the vehicle is manufactured, and Block A may include the vehicle details, such as make, model, vehicle identification number (VIN), color, manufacturing location, and manufacture date, for example. In the example, Block B 204 may be created when the vehicle is sold or leased, and Block B may include new owner information, previous owner information, cost of the vehicle, lender information, and mileage of the vehicle when sold, for example. Block C 206 may be created when the vehicle is driven from one place to another, and Block C may include the location of the first place and the location of the second place, as well as travel time and travel distance, for example. Block D 208 may be created when a vehicle routine is determined, such as a morning and evening commute, for example.

In another example, when the blockchain 200 is associated with a user who uses transportation as a service (e.g., ride sharing, taxi, or limousine), Block A 202 may be created when a user account associated with the user is created, and Block A 202 may include the user's name, the location of the user, billing information of the user, address of the user, and demographic information of the user, for example. In the example, Block B 204 may be created when the user takes a first trip from one place to another, and Block B may include the start location and destination of the first trip, as well as travel time and travel distance, for example. Block C 206 may be created when the user adds a favorite location to the user's list of frequently traveled destinations. Block D 208 may be created when a user's routine is determined, such as a morning and evening commute, for example.

In some embodiments, the blockchain 200 is associated with a particular vehicle owner's use of the vehicle, and when the vehicle is sold (i.e., a transfer of ownership occurs), the blockchain 200 may continue to be associated with the first owner. A new blockchain may be started for the second owner, or the second owner may have an existing blockchain that the now-transferred vehicle writes vehicle data to. When the first owner has a new vehicle, the new vehicle may write vehicle data to the first owner's blockchain. In this way, the vehicle data does not follow the vehicle, but rather the owner or user associated with the vehicle. This allows the vehicle owner or user to remain in control of the vehicle data that is associated with the vehicle owner or user.

Figure 3:
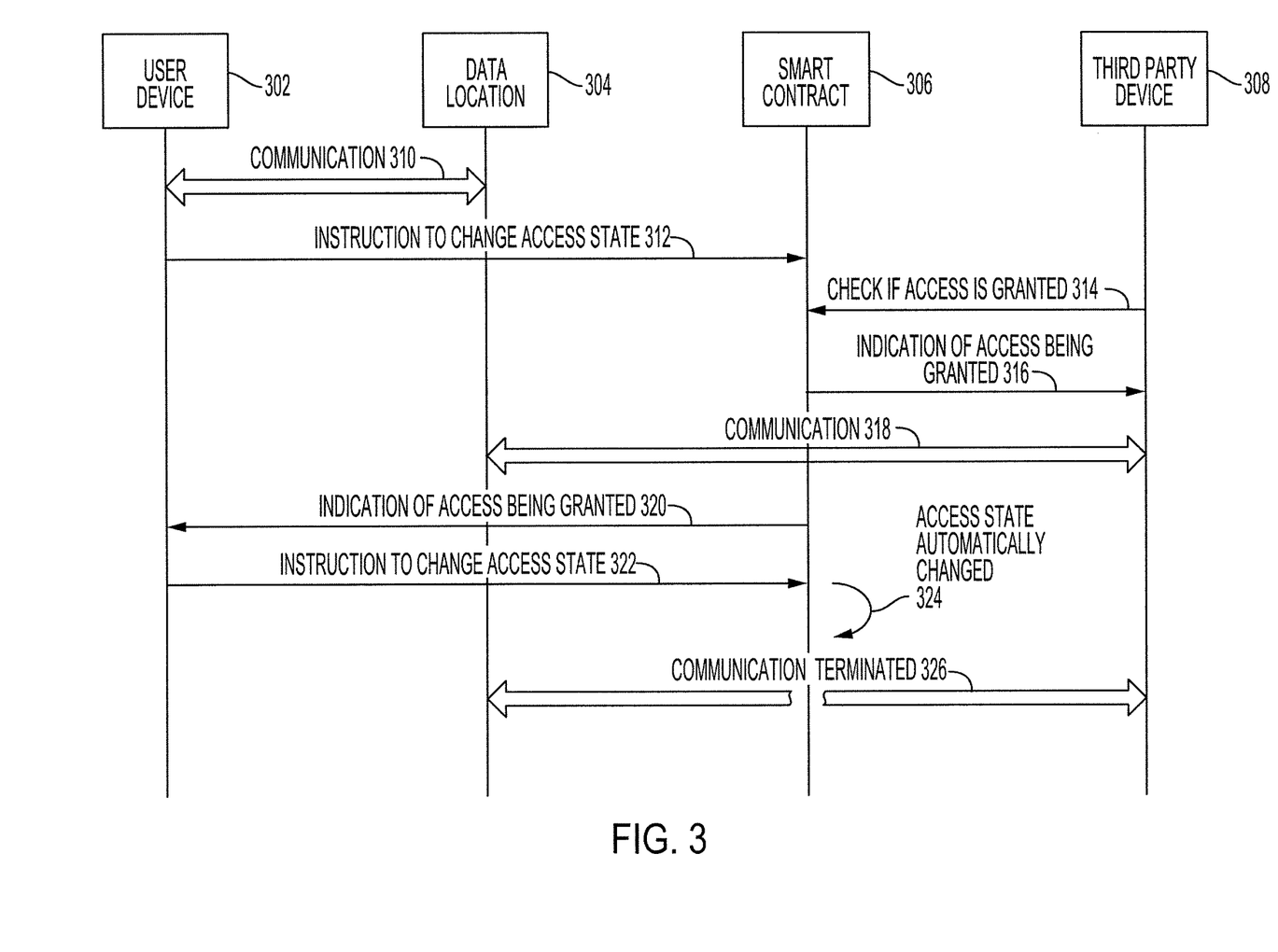
FIG. 3 illustrates a sequence diagram of various components of the system, according to various embodiments of the invention.

FIG. 3 illustrates a sequence diagram of interactions between various components of the systems described herein. The user device 302 may be a computing device associated with a user. The data location 304 may be a storage location of the user data and/or vehicle data. The data location 304 may be a distributed ledger, a server, or any other remotely accessible data storage device with restricted access. The smart contract 306 is a computer function located on a blockchain and used to facilitate an interaction between two or more parties. When the data location 304 is a blockchain, the smart contract 306 may be part of the blockchain. In some embodiments, the smart contract 306 is a part of a different blockchain separate from the data location 304.

The third-party device 308 is a computing device associated with a third party. The third party may be an advertising company, a merchant, or any other company interested in accessing the data stored in data location 304.

The user device 302 is in communication 310 with the data location 304. The user device 302 may be a vehicle or any other computing device. The user device 302 may write data, such as vehicle data and/or user data to the data location 304. When the data location 304 is a blockchain, the user device 302 may write blocks to the blockchain. The vehicle data may include location data, fuel data, entertainment data, driving pattern data, interactions between vehicles. Location data may indicate the location of the vehicle or user according to a location scheme, such as latitude and longitude. Fuel data may include data associated with the fuel of the vehicle, such as fuel level, fuel efficiency, and/or fuel usage patterns. As used herein, fuel may refer to anything used to power a vehicle, such as gasoline or electricity stored in a battery or generated from a fuel cell. Entertainment data may include any data associated with the infotainment unit of a vehicle or entertainment using a mobile device, such as radio stations dialed in to, music played, or videos played. Driving pattern data may include any determined commuting patterns or any determined vehicle usage patterns, such as a time and duration the vehicle is commonly used or the locations the vehicle is commonly driven to. Interactions between vehicles may include any data associated with vehicle to vehicle communication, including any messaging or telemetry data exchanged between vehicles.

The user device 302 communicates an instruction to the smart contract 306 to change the access state associated with the data location 304 (step 312). This communication may include the details of which device(s) to grant access to the data location 304, which types of data to allow access for, how long to allow access, and/or for what purposes to allow use of the data. The device(s) may be identified using a globally unique device identifier.

For example, the communication from the user device 302 to the smart contract 306 to allow access to the third-party device may include an identification of providing access to location data and fuel data for 10 hours and only if the third party identifies the purpose of the use of the data as being for advertising research.

In some embodiments, the user device 302 only communicates the instruction to the smart contract 306 in step 312 when the owner or user of the user device 302 (e.g., a vehicle) has a compensation arrangement with the third party associated with the third-party device 308. This allows the owner or user of the user device 302 to be compensated for accessing the vehicle data, instead of the conventional custodians of the vehicle data—the vehicle manufacturer.

The smart contract 306 receives the instruction to change the access state associated with the data location 304. In some embodiments, the smart contract 306 is communicatively coupled with the data location 304.

The third-party device 308 may communicate a request to the smart contract 306 to check if the third-party device 308 has access to the data location 304 (step 314). The smart contract 306 automatically provides an indication to the third-party device 308 of whether access to the data location 304 has been granted (step 316). In some embodiments, the smart contract 306 automatically provides the indication to the third-party device 308 as soon as the user device 302 changes the access state to grant access to the third-party device 308. In some embodiments, the smart contract 306 automatically provides the indication to the third-party device 308 only when the third-party device 308 checks whether access has been granted.

In some embodiments, the smart contract 306 provides authentication credentials to the third-party device 308 so that the third-party device may access the data location 304. In some embodiments, the data location 304 is in communication with the smart contract 306 and automatically provides access to the third-party device 308 when the user device 302 changes the access state with the smart contract 306.

The third-party device 308 is in communication 318 with the data location 304. In some embodiments, the third-party device 308 only has access to a portion of the data stored on the data location 304. The access may be restricted according to conditions defined by the user device 302. The conditions may be communicated by the user device 302 to the smart contract 306 in step 312. The conditions may be stored by the smart contract 306 as part of the defined current state. In some embodiments, the state of the smart contract 306 may allow for the access configurations of multiple third-party devices.

The smart contract 306, upon establishing communication with the third-party device 308, may communicate an indication to the user device 302 that access has been granted to the third-party device 308 (step 320). The communication 318 between the third-party device 308 and the data location 304 may exist until a condition terminating the access (stored as a state of the smart contract 306) is met, such as a time condition.

The communication 318 between the third-party device 308 and the data location 304 may exist until the user device 302 communicates an indication to the smart contract 306 to terminate access to the third-party device 308. The termination of access by the third-party device 308 to the data location 304 may be communicated by the user device 302 to the smart contract 306 as an instruction to change the access state of the smart contract 306 (step 322).

Upon receiving the instruction to change the access state of the smart contract 306, the access state of the smart contract 306 may be automatically changed (step 324). In some embodiments, step 324 is triggered when a condition terminating the access is met, such as a time condition.

The communication between the third-party device 308 and the data location 304 is terminated 326. The communication between the third-party device 308 and the data location 304 may be reestablished at a later time, by the user device 302.

FIGS. 4A-4E illustrate the process of FIG. 3 using blocks of a block diagram. FIGS. 4A-4E include a user device 402 similar to user device 302, a data location 404 similar to data location 304, a third-party device 406 similar to third-party device 308, and a smart contract 408 similar to smart contract 306.

Figure 4A:
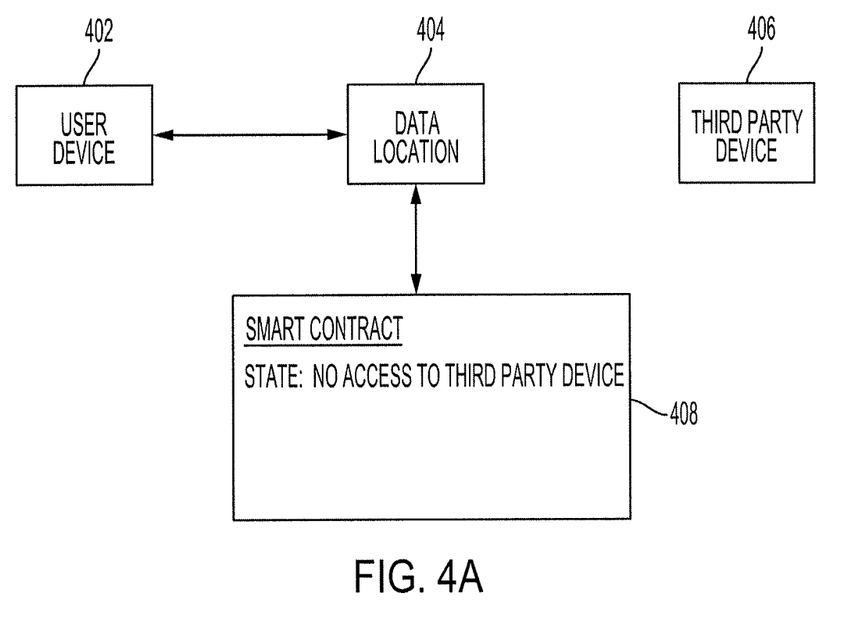
FIGS. 4A-4E illustrate a block diagram of interactions between components of the system, according to various embodiments of the invention.

FIG. 4A illustrates the user device 402 and the data location 404 being in communication with each other. The data location 404 and the smart contract 408 are also in communication with each other. The third-party device 406 is not in communication with any other component. The state of the smart contract 408 indicates no access is given to the third-party device 406.

Figure 4B:
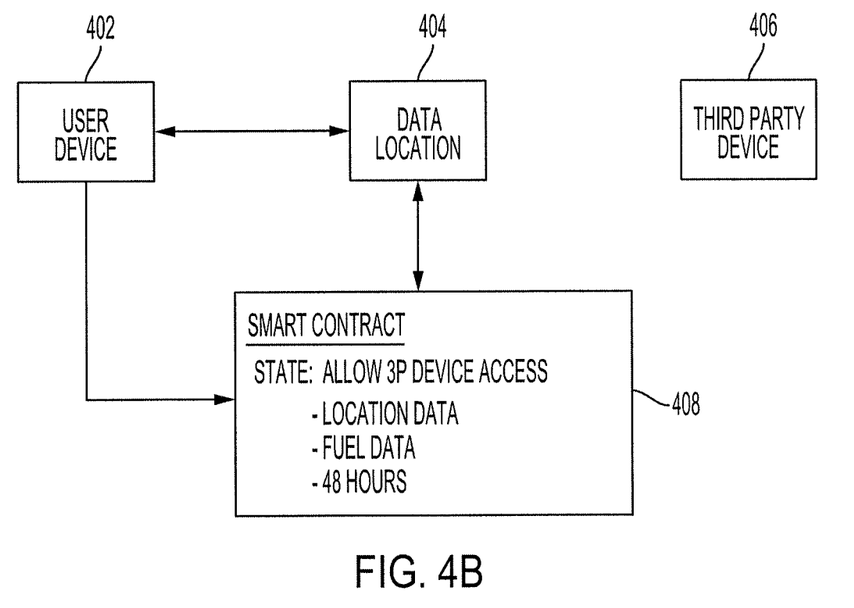

FIG. 4B illustrates the user device 402 communicating an instruction to the smart contract 408 to change the state of the smart contract 408. The smart contract 408 now has a state that allows access to the third-party device for location data and fuel data of the vehicle for 48 hours. In general, the access conditions stored by the smart contract may include what data is accessible, for how long, and the manner of use of the data. In this way, some jurisdictional privacy policies may be easily complied with, such as the General Data Protection Regulation (GDPR).

Figure 4C:
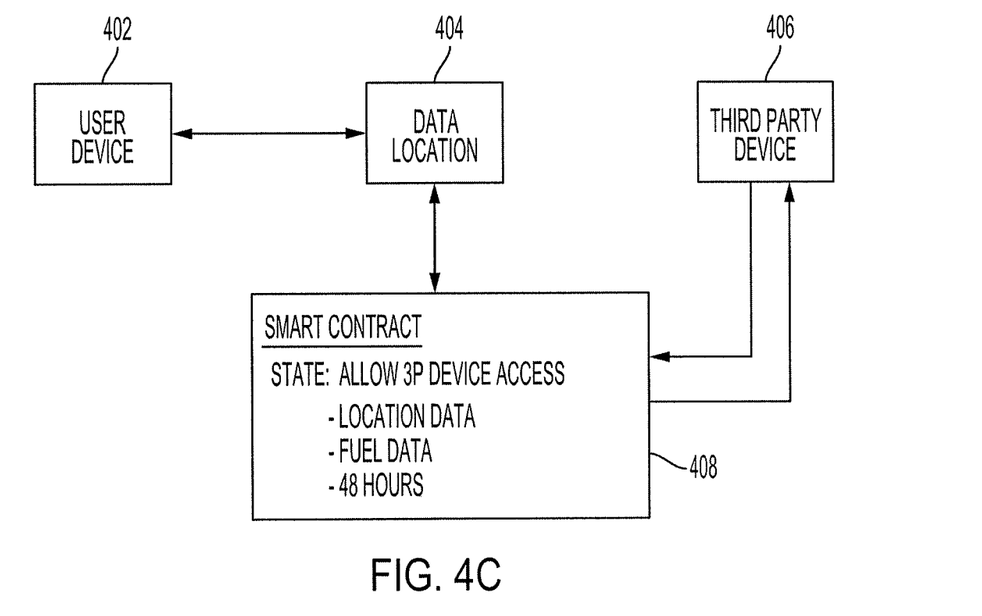

FIG. 4C illustrates the smart contract 408 and the third-party device 406 exchanging data, which may include a request from the third-party device 406 to the smart contract 408 regarding the state of the smart contract 408 and an indication from the smart contract 408 to the third-party device 406 regarding access being granted to the third-party device 406. The conditions of the third-party device 406 access to the data location 404 may be communicated by the smart contract 408 to the third-party device 406. In some embodiments, the user device 402 may communicate the conditions of access to the third-party device 406.

Figure 4D:
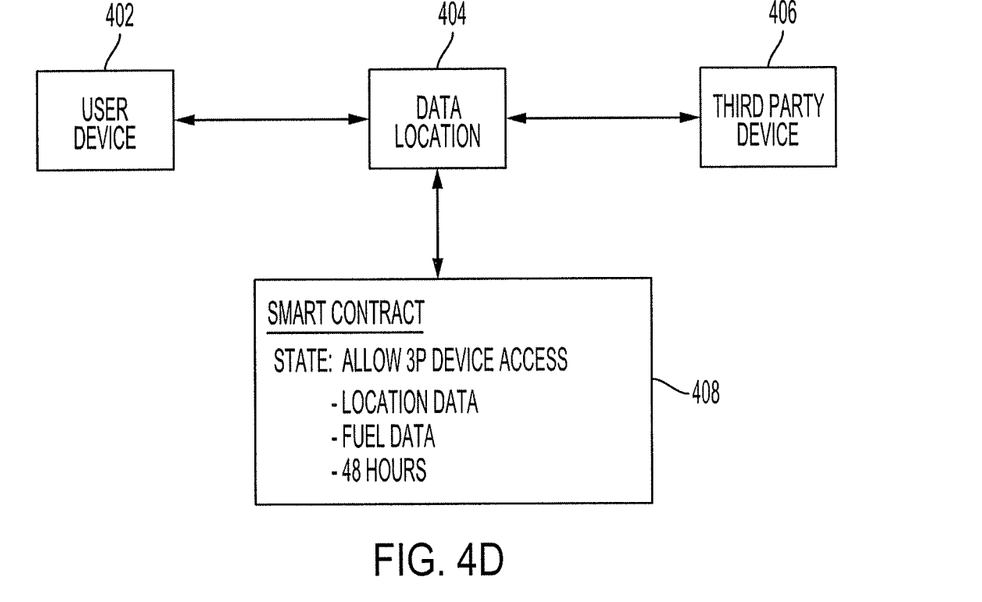

FIG. 4D illustrates the third-party device 406 having access to the data location 404 according to the conditions stored by the state of the smart contract 408. The smart contract 408 may communicate the conditions to the data location 404 and the data location 404 may regulate access by the third-party device 406. In some embodiments, the smart contract issues authentication credentials that are only valid for a predetermined amount of time. The authentication credentials may be registered with the data location 404 as being active for a limited amount of time.

Figure 4E:
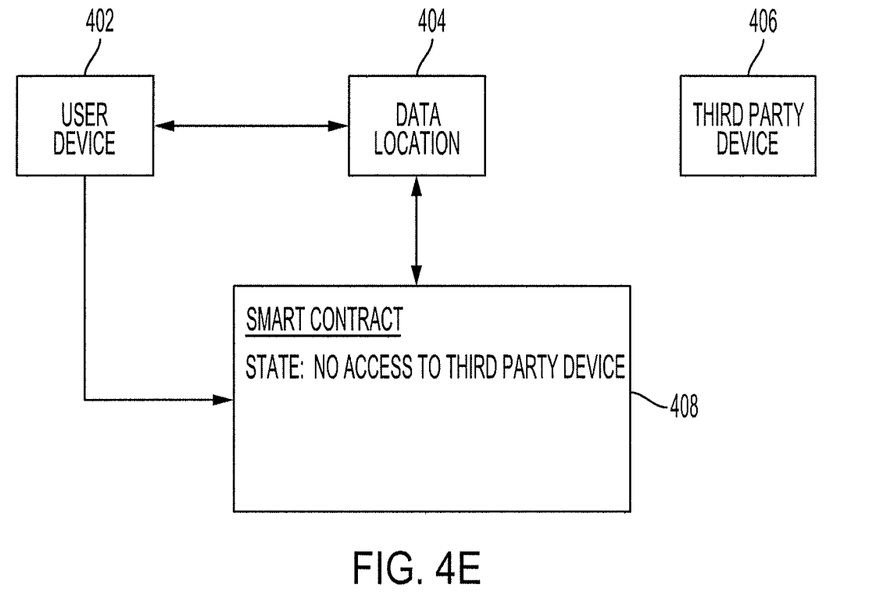

FIG. 4E illustrates the smart contract 408 having a state reflecting no access to the third-party device, and accordingly, the third-party device 406 is no longer in communication with the data location 404. In some embodiments, a time condition of the state of the smart contract 408 was met, and communication between the data location 404 and the third-party device 406 was automatically terminated. In some embodiments, the user device 402 communicates an instruction to the smart contract 408 to terminate the third-party device's access to the data location 404.

Figure 5:
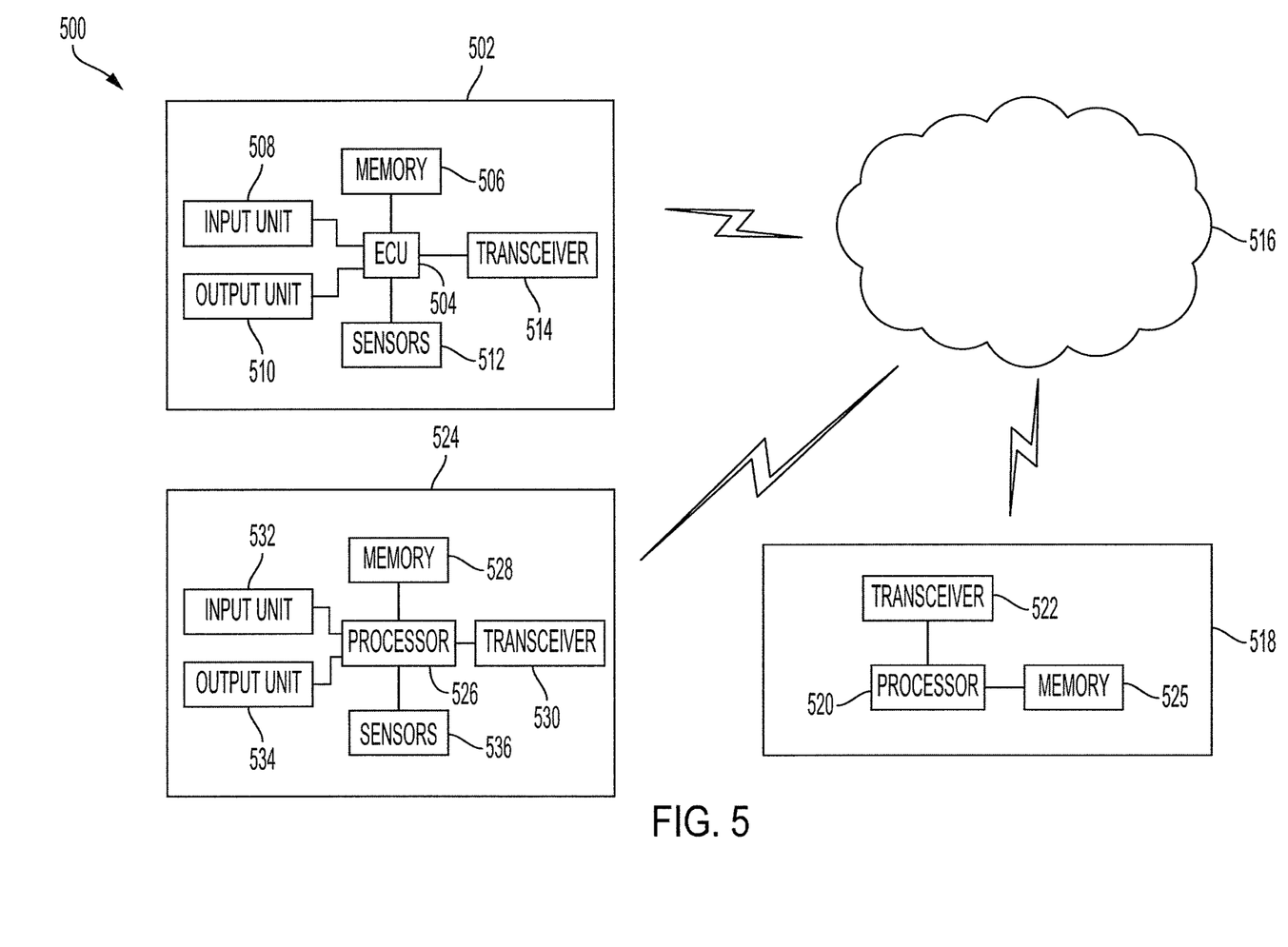
FIG. 5 illustrates a block diagram of an exemplary system, according to various embodiments of the invention.

FIG. 5 illustrates an example system 500, according to various embodiments of the invention. The system 500 includes a vehicle 502. The vehicle 502 may be associated with a vehicle identification or identifier, and a distributed ledger (e.g., blockchain 200) may be associated with the vehicle identification or identifier.

The vehicle 502 may have an automatic or manual transmission. The vehicle 502 is a conveyance capable of transporting a person, an object, or a permanently or temporarily affixed apparatus. The vehicle 502 may be a self-propelled wheeled conveyance, such as a car, a sports utility vehicle, a truck, a bus, a van or other motor or battery driven vehicle. For example, the vehicle 502 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 502 may be a semi-autonomous vehicle or an autonomous vehicle. That is, the vehicle 502 may be self-maneuvering and navigate without human input. An autonomous vehicle may use one or more sensors and/or a navigation unit to drive autonomously.

The vehicle 502 also includes one or more computers or electronic control units (ECUs) 504, appropriately programmed, to control one or more operations of the vehicle. The one or more ECUs 504 may be implemented as a single ECU or in multiple ECUs. The ECU 504 may be electrically coupled to some or all of the components of the vehicle. In some embodiments, the ECU 504 is a central ECU configured to control one or more operations of the entire vehicle. In some embodiments, the ECU 504 is multiple ECUs located within the vehicle and each configured to control one or more local operations of the vehicle. In some embodiments, the ECU 504 is one or more computer processors or controllers configured to execute instructions stored in a non-transitory memory 506.

The vehicle 502 includes one or more sensors 512 configured to detect various sensor data. The one or more sensors 512 may include a location sensor configured to detect location data associated with the vehicle 502. The location sensor may be a GPS unit, and the location data may be in the format of latitude and longitude coordinates. The one or more sensors 512 may include a fuel sensor configured to detect fuel data. The fuel may be a combustible gasoline or may be electrical charge stored in a battery. The fuel data may indicate a remaining amount of fuel, a remaining percentage of fuel, and/or a maximum storable amount of fuel.

The vehicle 502 may include an input unit 508 configured to receive input from a user, such as an occupant of the vehicle. The input unit 508 may be a touchscreen display of an infotainment unit, a keyboard, a camera configured to detect motions, a microphone, or one or more dials and/or buttons. The input unit 508 may be used to indicate whether a third party should have access to the vehicle data. The input unit 508 may also be used to specify conditions under which the third party has access to the vehicle data.

The vehicle 502 may also include an output unit 510 configured to provide an output to the user, such as an occupant of the vehicle. The output unit 510 may be a display or a speaker, for example. The output unit 510 may provide an indication of which third parties have access to the vehicle data and any conditions associated with the third party access to the vehicle data.

The vehicle 502 may also include a transceiver 514. The transceiver 514 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 514 may transmit data to and receive data from devices and systems not directly connected to the vehicle 502. The transceiver 514 may access the network 516. The transceiver 514 may also be used to communicate with other vehicles. Vehicles may exchange communications when executing autonomous driving functions, passing along detected information (e.g., traffic or road conditions), or communicating messages from driver to driver.

The network 516 may be a local area network (LAN), a wide area network (WAN), a cellular network, a digital short-range communication (DSRC), the Internet, or a combination thereof, and may connect the vehicle 502 to one or more computing devices, including one or more servers from different service providers. Each of the one or more servers may be connected to one or more databases. A service provider may provide navigational map, weather and/or traffic data to the vehicle 502.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such as the grade of an incline of a road, a terrain type of the road, or a curvature of the road. The construction information includes construction features such as construction zones and construction hazards.

The traffic data includes one or more traffic condition features, such as traffic congested areas or accident areas. The traffic data may provide information related to the density and movement of vehicles on a roadway and/or information related to accident locations.

The features, e.g., road features, political features, or traffic data, each have a location that may be identified by map coordinates. The map coordinates may be defined by latitude and longitude coordinates.

The memory 506 is connected to the ECU 504 and may be connected to any other component of the vehicle 502. The memory 506 is configured to store any data described herein, such as the map data, the location data, and any data received via the transceiver 514. The memory 506 may also store a copy of the distributed ledger where the user data and/or vehicle data is recorded.

The ECU 504 may be configured to determine driving pattern data of the vehicle, such as a commuting pattern, including a typical departure time from a starting location, a typical arrival time at a destination, a typical route taken, a typical length of the commute in terms of time and distance, and any stops typically taken (e.g., a café or a restaurant). The ECU 504 may determine the driving pattern data based on the detected and stored location data. The driving pattern data may be stored in memory 506 and/or written to the distributed ledger. The driving pattern data may be anonymized to conceal information that may be used to identify the user of the vehicle, such as the home address or workplace address. The driving pattern data may be part of the vehicle data accessed by the third party.

The ECU 504 may also be configured to determine entertainment data associated with the user of the vehicle. The entertainment data may include music, other audio content (e.g., news or podcasts), or video content consumed by the user via an infotainment unit of the vehicle. The entertainment data may be stored in memory 506 and/or written to the distributed ledger. The entertainment data may be part of the vehicle data accessed by the third party.

The system 500 may also include a computing device 524 associated with a user. The computing device 524 may be any computing device, such as a laptop, a smartphone, a tablet, or a wearable device, for example. The computing device 524 associated with the user may be used in the system 500 when the user is not associated with one particular vehicle, such as situations where transportation is a service (e.g., taxis, ride sharing, limousines). The computing device 524 may be associated with a user identification or identifier, and a distributed ledger (e.g., blockchain 200) may be associated with the user identification.

The computing device 524 associated with the user includes a processor 526, a memory 528, a transceiver 530, an input unit 532, an output unit 534, and one or more sensors 536. The processor 526 (and any processors described herein) may be one or more computer processors configured to execute instructions stored on a non-transitory memory. The memory 528 may be a non-transitory memory configured to store the instructions to be executed by the processor 526.

The transceiver 530 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 530 may transmit data to and receive data from devices and systems not directly connected to the computing device 524 associated with the user. The transceiver 530 may access the network 516.

The input unit 532 is configured to receive input from the user. The input unit 532 may be a touchscreen display, a keyboard, a camera configured to detect motions, a mouse, or a microphone. The input unit 532 may be used to indicate whether a third party should have access to the user data. The input unit 532 may also be used to specify conditions under which the third party has access to the user data.

The output unit 534 is configured to provide an output to the user. The output unit 534 may be a display screen or a speaker, for example. The output unit 534 may provide an indication of which third parties have access to the vehicle data and any conditions associated with the third-party access to the vehicle data.

The sensors 536 may include a location sensor configured to detect location data associated with the computing device 524 associated with the user. The location sensor may be a GPS unit, and the location data may be in the format of latitude and longitude coordinates. The location data of the user may be detected when the user is in a vehicle, and the user's location data as it pertains to travel may be recorded.

The memory 528 may also be configured to store user data, such as user location data or user commute data indicating the commuting schedule of the user. The memory 528 may also store a copy of the distributed ledger where the user data and/or vehicle data is recorded. In some embodiments, the computing device 524 may be used by an owner or user of the vehicle 502 to manage the vehicle data access associated with the vehicle 502.

The system 500 also includes a computing device 518 associated with a third party. The third party may be an advertising company contracted by one or more merchants of goods and/or services to present promotional offers and advertisements to users on behalf of the one or more merchants. The third party may be a merchant who is interested in the location of vehicles and/or the fuel consumption of vehicles, such as a fuel transportation provider or a vehicle manufacturer. The computing device 518 includes a processor 520, a transceiver 522, and a memory 525. The processor 520 may be one or more computer processors configured to execute instructions stored on a non-transitory memory. The memory 525 may be a non-transitory memory configured to store the instructions to be executed by the processor 520.

The transceiver 522 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 522 may transmit data to and receive data from devices and systems not directly connected to the computing device 518 associated with the third party. The transceiver 522 may access the network 516.

As used herein, a "unit" may refer to hardware components, such as one or more computer processors, controllers, or computing devices configured to execute instructions stored in a non-transitory memory.

Figure 6:
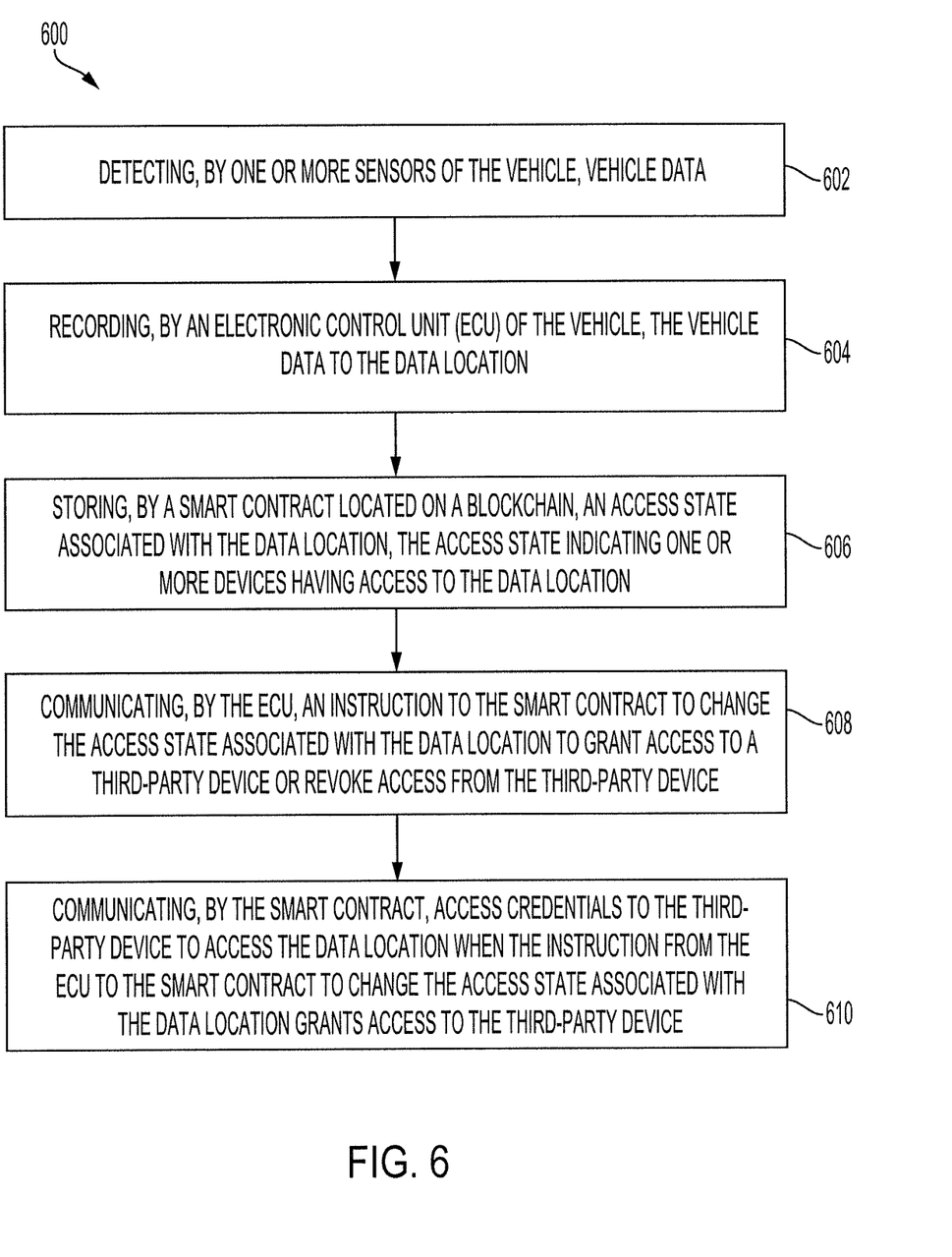
FIG. 6 illustrates a flow diagram of a process performed by the system, according to various embodiments of the invention.

FIG. 6 illustrates a flowchart of a process 600 of managing access to a data location associated with a vehicle.

One or more sensors of the vehicle detect vehicle data (step 602). The one or more sensors may be at least one of a location sensor configured to detect location data or a fuel sensor configured to detect fuel data. As described herein, fuel may refer to gasoline or electricity stored in a battery.

An electronic control unit (ECU) of the vehicle records the vehicle data to the data location (step 604). The data location may be a distributed ledger, such as a blockchain, as described herein. The data location may also be a remote server which is maintained by an entity. The vehicle data may also include entertainment data, driving pattern data, or interactions between vehicles, each as described herein.

A smart contract located on a blockchain stores an access state associated with the data location (step 606). The smart contract may be located on the same blockchain that the vehicle data is located on or may be located on a separate blockchain. The access state stored on the smart contract may indicate one or more devices having access to the data location and any respective conditions of access. For example, the access state may indicate that a first computing device has access to the location data of the vehicle for 24 hours and that a second computing device has access to the fuel data of the vehicle for 72 hours.

The ECU of the vehicle communicates an instruction to the smart contract to change the access state to grant access to a third-party device or revoke access from the third-party device (step 608). The instruction may include any conditions associated with the access granted to the third-party device.

When access is granted to a third-party device, the smart contract may automatically communicate access credentials to the third-party device (step 610). The access credentials may only be active for a predetermined time-period. When the time-period associated with the access credentials expires and/or the time period stored in the access state of the smart contract expires, third-party access to the data location may be automatically revoked.

By allowing the vehicle (or alternatively another computing device associated with the user of the vehicle) to direct the granting and revoking of access to the data location, the ability to manage access to the vehicle data is in the hands of the vehicle owner/user. The vehicle owner/user may be compensated for providing access to the vehicle data at the data location. The vehicle data at the data location may be anonymized to promote the privacy of the user. When the data location is a distributed ledger, such as a blockchain, the owner/user of the vehicle may be assured that the vehicle data on the distributed ledger cannot be manipulated by anyone who has access granted to the vehicle data, and the third-party device user may be assured that the vehicle data is genuine and reliable.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for managing access to a data location associated with a driver or a user of a vehicle, the system comprising:
   one or more sensors of the vehicle configured to detect vehicle data;
   a smart contract located on a blockchain and configured to execute one or more computer functions including storing an access state associated with the data location, the access state indicating one or more authorized devices having access to the data location; and
   an electronic control unit (ECU) of the vehicle configured to record the detected vehicle data to the data location and communicate an instruction to the smart contract to change the access state associated with the data location to grant access to a third-party device by including the third-party device in the one or more authorized devices or revoke access from the third-party device by excluding the third-party device from the one or more authorized devices,
   wherein the smart contract is further configured to communicate access credentials to the third-party device to access the data location when the third-party device is granted access to the data location.

2. The system of claim 1, wherein the smart contract is further configured to communicate an indication to the third-party device whether the third-party device has access to the data location.

3. The system of claim 1, wherein the data location is a first blockchain and wherein the smart contract is located on the first blockchain or a second blockchain, and
   wherein the ECU is configured to record the detected vehicle data to the first blockchain by writing one or more blocks corresponding to the detected vehicle data to the first blockchain.

4. The system of claim 1, wherein the vehicle data includes at least one of location data, fuel data, entertainment data, driving pattern data, or interactions between vehicles,
   wherein interactions between vehicles include messaging or telemetry data exchanged between the vehicle and one or more other vehicles.

5. The system of claim 1, wherein the instruction to change the access state includes one or more types of vehicle data that the third-party device is being granted access to.

6. The system of claim 1, wherein the instruction to change the access state includes a time limit of access by the third-party device, and wherein the smart contract is further configured to automatically revoke access from the third-party device when the time limit of access expires.

7. A vehicle comprising:
   one or more sensors configured to detect vehicle data; and
   an electronic control unit (ECU) of the vehicle configured to:
   record the detected vehicle data to a data location, and
   communicate an instruction to a smart contract to change an access state associated with the data location to grant access to a third-party device or revoke access from the third-party device, the smart contract being located on a blockchain and being configured to execute one or more computer functions including storing the access state associated with the data location and communicating access credentials to the third-party device to access the data location when the third-party device is granted access to the data location.

8. The vehicle of claim 7, wherein the data location is a first blockchain and wherein the smart contract is located on the first blockchain or a second blockchain, and
   wherein the ECU is configured to record the detected vehicle data to the first blockchain by writing one or more blocks corresponding to the detected vehicle data to the first blockchain.

9. The vehicle of claim 7, wherein the data location is a remote server.

10. The vehicle of claim 7, wherein the instruction to change the access state includes one or more types of vehicle data that the third-party device is being granted access to.

11. The vehicle of claim 7, wherein the instruction to change the access state includes a time limit of access by the third-party device.

12. The vehicle of claim 7, wherein the one or more sensors include at least one of a location sensor configured to detect a location of the vehicle or a fuel sensor configured to detect an amount of fuel remaining in the vehicle or a rate of fuel usage.

13. A method for managing access to a data location associated with a driver or a user of a vehicle, the method comprising:

detecting, by one or more sensors of the vehicle, vehicle data;

recording, by an electronic control unit (ECU) of the vehicle, the vehicle data to the data location;

storing, by a smart contract located on a blockchain, an access state associated with the data location, the access state indicating one or more authorized devices having access to the data location;

communicating, by the ECU, an instruction to the smart contract to change the access state associated with the data location to grant access to a third-party device by including the third-party device in the one or more authorized devices or revoke access from the third-party device by excluding the third-party device from the one or more authorized devices; and communicating, by the smart contract, access credentials to the third-party device to access the data location when the instruction from the ECU to the smart contract to change the access state associated with the data location grants access to the third-party device.

14. The method of claim 13, further comprising communicating, by the smart contract, an indication to the third-party device of whether the third-party device has access to the data location.

15. The method of claim 13, wherein the instruction to change the access state includes one or more types of vehicle data that the third-party device is being granted access to.

16. The method of claim 13, wherein the instruction to change the access state includes a time limit of access by the third-party device, and wherein the method further comprises automatically revoking, by the smart contract, access from the third-party device when the time limit of access expires.

* * * * *